United States Patent [19]
Heath

[11] 3,762,439
[45] Oct. 2, 1973

[54] FLUID MIXING VALVE ASSEMBLY
[75] Inventor: Walter Heath, Chicago, Ill.
[73] Assignee: Parkland International Inc., Melrose Park, Ill.
[22] Filed: Dec. 6, 1971
[21] Appl. No.: 205,204

[52] U.S. Cl. ................. 137/549, 137/604, 251/206
[51] Int. Cl. ........................................... F16k 19/00
[58] Field of Search ........................... 137/549, 604; 417/190; 251/206; 431/354, 355

[56] References Cited
UNITED STATES PATENTS

| | | | |
|---|---|---|---|
| 1,253,143 | 1/1918 | Caldwell | 251/206 |
| 2,953,160 | 9/1960 | Brazier | 137/604 X |
| 2,746,606 | 5/1956 | Henning | 137/549 X |
| 2,510,356 | 6/1950 | Werts | 251/206 X |
| 1,679,219 | 7/1928 | Huff | 137/604 |
| 3,024,806 | 3/1962 | Colonna | 251/206 X |
| 3,084,634 | 4/1963 | McDougall | 137/604 X |

Primary Examiner—Robert G. Nilson
Attorney—Dominik, Knechtel & Godula

[57] ABSTRACT

There is disclosed a mixing device for mixing a first fluid with a second fluid, the device including valve means for metering and controlling the amount of second fluid which is permitted to mix with the first fluid entering the device, the device generally including a mixing body having a fluid inlet for permitting entry of a first fluid, and a fluid outlet spaced therefrom, valve means interposed in the fluid path between the fluid inlet and fluid outlet for metering and controlling the amount of a second fluid entering the mixing body, the mixing body permitting the mixture of the first fluid with the second fluid, and the mixed fluids thereafter being permitted to exit from the mixing body through the fluid outlet. The valve assembly is manually operable and permits the operator to select the desired valve opening thereby to meter and control the amount of second fluid entering the mixing device.

4 Claims, 10 Drawing Figures

PATENTED OCT 2 1973

PATENTED OCT 2 1973 3,762,439
SHEET 2 OF 2
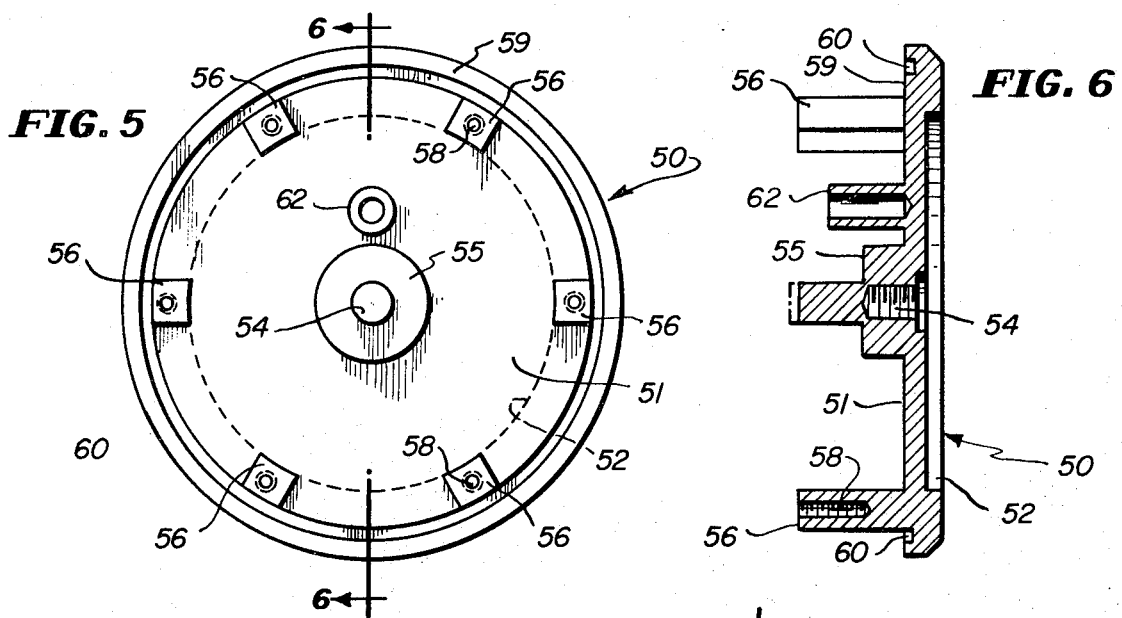
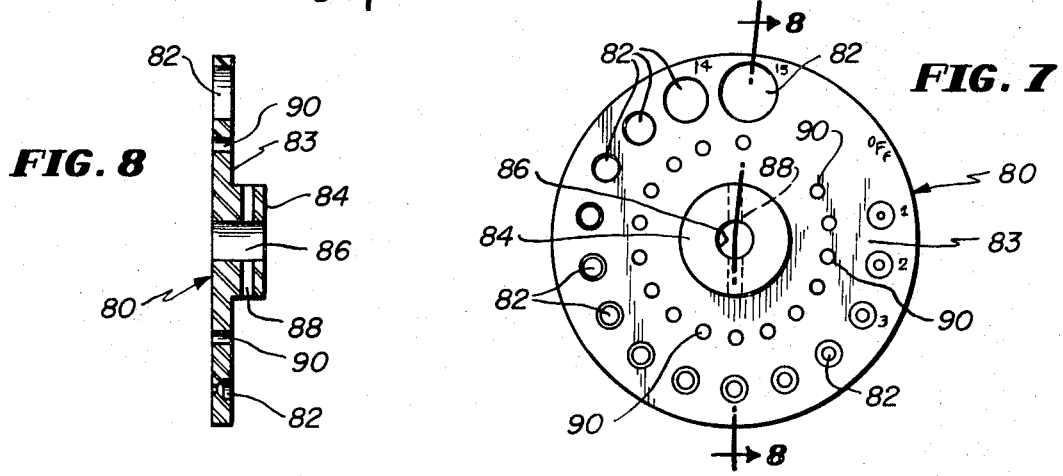
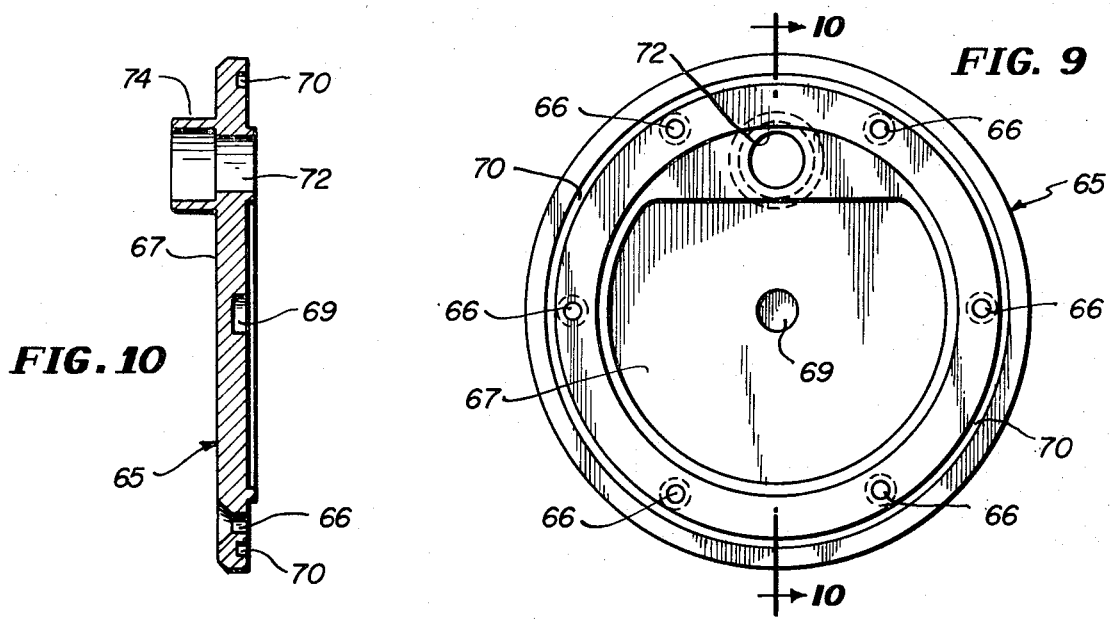

FLUID MIXING VALVE ASSEMBLY

BRIEF DESCRIPTION OF THE INVENTION

The present invention is directed to a mixing device, for mixing a first fluid with a second fluid which includes a valve assembly for metering and controlling the amount of the second fluid which is permitted to mix with the first fluid entering the mixing device. More specifically, the mixing device of the present invention is particularly designed for the purpose of facilitating and more accurately controlling the mixture of oxygen with air, the oxygen-air mixture then being utilized in connection with an oxygen tent, or other similar hospital appliance.

The apparatus of the present invention includes an adjustable valve means whereby an operator may select the desired ratio of oxygen to air by manipulating the valve means and hence, controlling the quantity or volume of air which is permitted to enter the mixing device, and mix with the oxygen entering the mixing device from a separate fluid inlet. Hence, the mixing device of the present invention achieves a greater degree of accuracy than heretofore obtainable by prior art type devices, represents a significantly more simplified construction manifesting itself in a lower cost, and is inherently easier to operate whereby persons with only limited training may effectively operate the device.

BACKGROUND OF THE INVENTION

The prior art with regard to valve assemblies is quite apparently a very crowded art field. undoubtedly, the only relevant manner of discussing prior art type valve assemblies is to view those assemblies which have particular applications in order to adequately appreciate the field of use and the particular valve assembly as it affects that field of use. In this connection there are several prior art patents which illustrate valve means for mixing fluids, such as gases, in order to achieve a mixture which is subsequently delivered to a point for subsequent use.

Various prior art patents illustrate valve structures which appear to be somewhat similar, though not completely relevant to the structure of the present invention. For example, in U.S. Pat. No. 3,014,489, issued on Dec. 26, 1961 to J.K. Lamp Jr., et al., there is shown a gas valve structure which includes a pair of discs having a plurality of various sized openings therethrough, the discs being rotated one with respect to the other in order to control fluid flow and fluid mixture. In FIG. 1 of the drawings of the aforementioned patent, it is noted that the valve plate includes a plurality of apertures, each of which is larger than the next adjacent aperture. In addition, as shown in FIG. 2 of the drawings therein, the valve assembly includes a plunger slideably mounted on a support which is secured to the body portion of the valve and is releasably urged by a spring into engagement with recesses, thereby to hold the valve plate in position with the desired size aperture in registry with the appropriate opening. However, it is to be noted that the valve assembly of the structure depicted in the -489 patent includes many moving parts, and is therefore very intricate in construction and costly to manufacture. In this connection, it is noted that this structure is designed to accommodate a pair of apertured discs for controlling the fluid flow of two different fluids whereas the valve assembly of the present invention achieves a controlled mixture of two fluids by merely regulating and metering one fluid with respect to the second.

Another patent which illustrates a multiple orificed valve is shown in U.S. Pat. No. 3,207,181, issued on Sept. 21, 1965 to R.S. Willis. The valve assembly illustrated therein includes a pair of rotatable discs, each disc having a pair of openings. Each of the two discs is rotatably movable, one with respect to the other, and by rotating either or both of the discs, the mixture of the gas entering through the gas valve and hence, through the openings in the appropriate discs, is thereby regulated and controlled. It is to be noted that the valve assembly as shown in the -181 patent hence of necessity, must have a pair of discs each having a pair of openings which are rotatably moved one with respect to the other, thereby to vary the horizontal alignment of the apertures, thereby to control the aperture size and hence, fluid flow therethrough. The present invention, on the other hand, contemplates a more accurate and precise means of controlling fluid flow by having a particular aperture selected to achieve a particular concentration of one fluid with respect to the other. In this manner, a more precise and controlled fluid mixture is obtained. Furthermore, the valve assembly as shown in the -181 patent, once again, includes many moving parts and is therefore not only difficult to construct, but quite costly in manufacture.

In U.S. Pat. No. 2,534,046, issued on Dec. 12, 1950, to G.A. Mau, there is shown another form of valve construction utilized in connection with proportioning devices. This type of valve structure has an aperture valve plate, which once again, controls the fluid flow by means of moving this plate into and out of horizontal alignment with the fluid flow line. It will be noted, however, that once again, a more imprecise fluid mixture would be obtained since it is inherently more difficult to control the size of the aperture controlling the volume or quantity of fluid passing through, since the operator is relying upon the relative degree of opening achieved by moving the pivotal plate with respect to a fixed plate in order to adjust the size of the opening. The present invention, as has been indicated hereinabove, achieves a high degree of accuracy since a specific aperture size is utilized in order to achieve a particular concentration of the fluid entering therethrough and which is subsequently mixed with the second fluid. In this manner, a very highly controlled mixture of two fluids is achieved.

Another valve structure which teaches the use of an apertured disc is shown in U.S. Pat. No. 2,889,852, issued on June 9, 1959 to J.L. Dunlap. As particularly noted in FIG. 3 of the drawings, there are two inlet lines and two exit lines for fluid to flow through, the apertures in the valve disc being in horizontal alignment with the aforementioned inlet and exit lines. Fluid flow is controlled by means of turning the valve disc plate such that the two apertures disposed therethrough are taken out of perfect horizontal alignment with respect to the inlet lines, thereby decreasing the size of the aperture through which fluid is permitted to flow. It is clear that in order to permit the valve assembly of the -852 patent to be operable, it is necesary that the valve plate be disposed between a pair of plates which are also apertured such that by movement of the centrally disposed valve plate or disc, the apertures disposed therein cooperate with the apertures in the top and bottom plates thereby to increase or decrease respectively the aperture size. Once again, while a valve structure has been obtained which controls fluid flow therethrough, nevertheless, precise control and regulation of the amount of fluid through the valve disc apertures is difficult, since one is relying upon the relative degree of opening permitted by opening of the disc plate with respect to the top and bottom plates respectively. Hence, it is apparent that the same problem noted with respect to the other prior art type valve structures similarly appear in the aforementioned device.

A multitude of other prior art patents and prior art devices exist with respect to valve structures. Usually, such valve structures and devices are designed to accomplish specific functions and purposes and hence, in the usual case, it is virtually impossible to apply a particular known valve structure to a different or varied intended purpose or function. For example, none of the prior art valve structures discussed hereinabove are concerned particularly with the problem of achieving a precise and controlled mixture of air and oxygen such as is used in connection with oxygen tents, oxygen hoods, oxygen masks, or other equipment utilized to provide an artifical oxygen-air environment for a patient.

It is therefore the principal object of the present invention to provide a valve assembly which is relatively simple in construction, but which nevertheless, operates to provide a controlled and precisely regulated mixture of oxygen and air especially useful in connection with patient treatment.

Another object of the present invention is to provide a valve assembly which is relatively simple in construction and includes a mixing body having a fluid inlet and a fluid outlet, an aperture disposed in said mixing body intermediate the fluid inlet and fluid outlet, a valve assembly, including means for removable engagement in the aperture, the valve assembly including a top closure plate, a bottom closure plate, and valve means fixedly secure between the top plate and the bottom plate, the valve means being adjustable so as to regulate the volume of fluid passing therethrough, whereby controlled mixture of two fluids may be obtained when a first fluid is permitted to enter through the fluid inlet of the mixing body and the second fluid is permitted to enter through the valve means, the second fluid being controlled and regulated in terms of concentration with respect to the first fluid.

In connection with the foregoing object, it is another object of the present invention to provide a valve assembly of the type set forth, wherein the valve means comprises an apertured valve disc including a plurality of circumferentially disposed apertures disposed therethrough, each of the apertures having a slightly greater diameter than the next adjacent aperture whereby the rotational movement of the valve means will cause the registry of one of the apertures with an inlet opening in the valve means thereby to permit a controlled amount of fluid therthrough for mixture with another mixture entering through the fluid inlet of the mixing body producing a controlled mixture of the two fluids.

Yet a further object of the present invention is to provide a mixing body and valve means assembly which further includes a filter means associated with the valve assembly thereby to filter the fluid entering into the valve assembly from the atmosphere to produce a dust-free mixture of two fluids.

Another object of the present invention is to provide a mixing body and valve assembly of the type described, which is so constructed as to provide a venturi effect in order to achieve a uniform and thoroughly mixed concentrations of gases or fluids as the same pass through the mixing body.

Yet a further object of the present invention is to provide a mixing body and valve assembly wherein the valve assembly has a simplified construction including a top plate, a bottom plate, and a valve disc plate interposed therebetween, the valve disc plate held in biased relationship with respect to the top plate by means of spring biasing means, and which further includes intermittent stop means for facilitating the accurate registry of one of the apertures in the valve disc in registry with the appropriate inlet opening in the valve assembly to permit fluid to enter the mixing body and mix with the fluid entering through the fluid inlet disposed in the mixing body.

In connection with the foregoing object, it is another object of the present invention to provide handle means external of the valve assembly, the handle means being connected to the valve disc whereby the operator may cause rotation of the valve disc by rotatably moving the handle means thereby to effect registry of the appropriate or desired aperture in the valve disc with the inlet opening disposed in the valve assembly.

Further features of the invention pertain to the particular arrangement of the elements and parts whereby the above-outlined and additional operating features thereof are attained.

The invention, both as to its organization and method of operation, together with further objects and advantages thereof will best be understood by reference to the following specification, taken in connection with the accompanying drawings in which:

FIG. 5 is a top plan view of the top plate of the valve assembly;

FIG. 6 is a side cross-sectional view of the top plate of the valve assembly taken in the direction of the arrows along the line 6—6 of FIG. 5;

FIG. 7 is a top plan view showing the valve disc plate including a series of circumferentially disposed apertures therein which forms a part of the valve assembly;

FIG. 8 is a side cross-sectional view of the valve disc plate taken in the direction of the arrows along the line 8—8 of FIG. 7;

FIG. 9 is a top plan view of the bottom plate forming a part of the valve assembly; and FIG. 10 is a side cross-sectional view of the bottom plate forming a part of the valve assembly taken in the direction of the arrows along the line 10—10 of FIG. 9.

Figure 1:
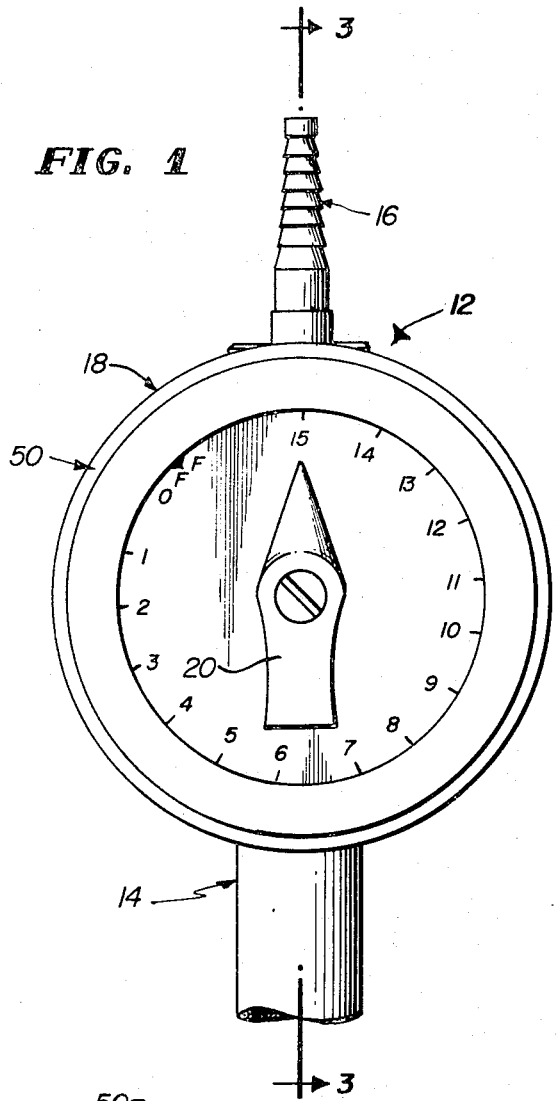
FIG. 1 is a top plan view of the mixing body and valve assembly of the present invention showing the valve assembly in positon in relation to the mixing body.
Figure 2:
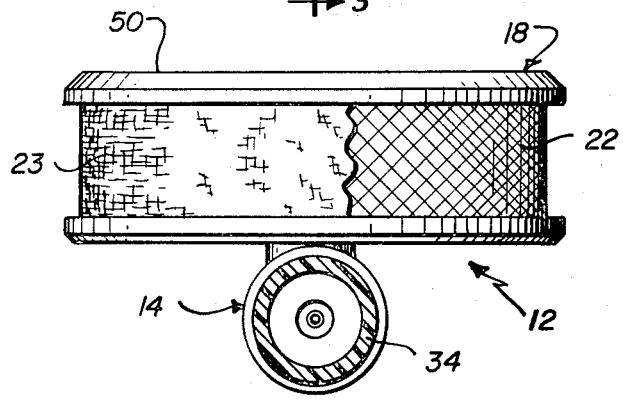
FIG. 2 is a side elevational view, partly in cross section, showing the engaged relationship between the valve assembly and the mixing body.

Referring now more particularly to FIGS. 1 and 2 of the drawings, the mixing body and valve assembly of the present invention is more particularly illustrated. The complete valve apparatus, generally referred to by the numeral 12 herein, generally comprises a mixing body 14, a nozzle element 16, and a valve assembly 18. As shown in FIG. 1, the upper portion of the valve assembly 18 includes a plurality of numerical indicia, which are provided for a purpose to be described hereinafter, and a rotatable handle member 20, which may be manually rotated and set at one numerical indicia.

FIG. 2 more clearly indicates the positional relationship of the valve assembly 18 with respect to the mixing body 14. It will be noted that in the preferred embodiment, the valve assembly 18 is generally circular in configuration, and includes a filter support screen 22 circumferentially disposed about the valve assembly 18 which carries and supports a filter 23 for filtering larger particular matter from the second fluid. The valve assembly 18 is shown to be press-fitted into an appropriate aperture disposed in the mixing body 14 in a manner which will be more fully described hereinafter.

Figure 3:
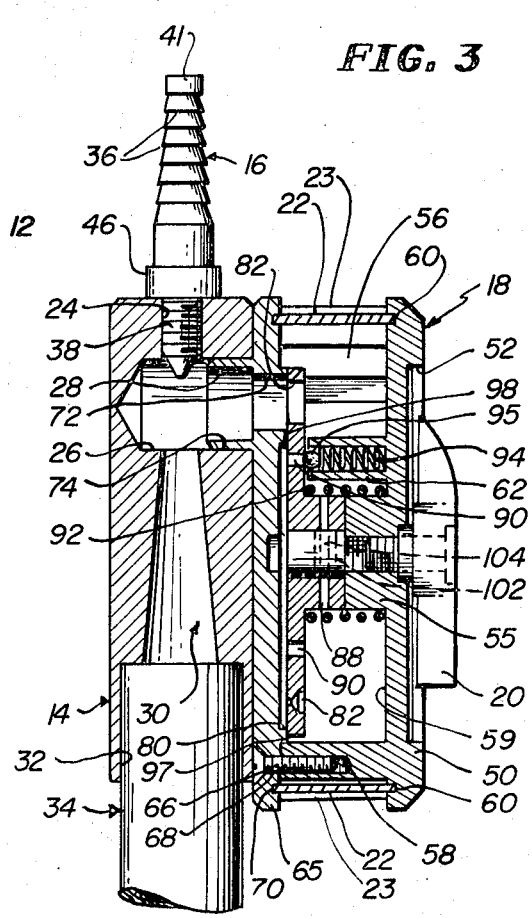
FIG. 3 is a side cross sectional view showing the valve assembly and the mixing body in juxtaposed relationship taken in the direction of the arrows along the line 3—3 of FIG. 1.

As more particularly shown in FIG. 3 of the drawings, the mixing body 14 of the valve apparatus 12, is provided with a threaded fluid inlet aperture 24 which accommodates therein the nozzle element 16. For the sake of convenience, the portion of the mixing body 14, having the threaded inlet aPerture 24 therein shall be referred to as the forward end of the mixing body 14, and the opposed end of the mixing body 14 shall be referred to as the rearward portion thereof. Immediately rearward of the threaded inlet aperture 24 is a mixing chamber 26 which is generally circular in configuration and is open to the atmosphere at one end thereof, and having a closed lower end. The upper end 28 of the mixing chamber 26 forms an aperture which accommodates therein the valve assembly 18 in press-fitted engagement, in a manner to be more fully described hereinafter.

Rearward of the mixing chamber 26, is a frustoconical section 30, which in turn, terminates at its rearward end in a delivery tube receiving chamber 22. The receiving chamber 32 has an inner diameter the same as or slightly greater than the diameter of a delivery tube 34, which is inserted therein, either in press-fitted relationship or in some other suitable manner.

Hence, it will be observed that a fluid such as gas or the like, which is delivered into the mixing body 14, through the nozzle element 16, when threadedly engaged in the threaded inlet aperture 24, air is permitted to pass through the mixing body via mixing chamber 26, first conical section 30 and delivery tube receiving chamber 32, and hence into the delivery tube 34 for ultimate delivery to either the patient or some other medical equipment such as a nebulizer or the like.

Figure 4:
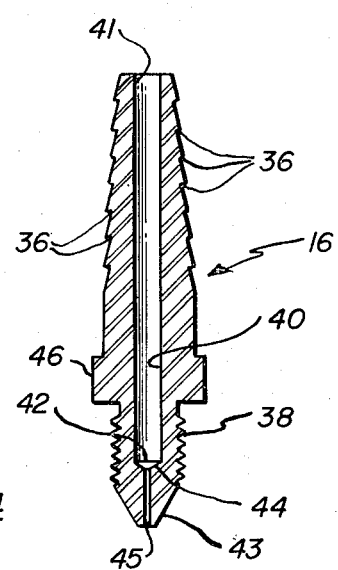
FIG. 4 is a side cross-sectional view of the nozzle forming the fluid inlet of the mixing vent and showing the venturi tube which produces the venturi effect.

FIGS. 3 and 4 illustrate the construction of the nozzle element 16, and as shown more particularly in FIG. 4, the nozzle element is of unitary construction and includes a series of diametrically increasing tube retention rings 36 at one end thereof, which rings 36 are designed to receive, grasp and hold an appropriate delivery tube (not shown) in the manner known in the art, and the opposed end of the nozzle element 16 is shown to be threaded as at 38, the threads 38 being so constructed as to threadedly mate with the threaded inlet aperture 24. It will further be noted that the nozzle element 16 includes a central core 40 which is of substantial uniform diameter throughout the length of the nozzle element from the outer inlet end 41 to a point 42 set slightly rearwardly from the inner end 43, the point 42 representing the point of taper of the central core 40. The core 40 tapers commencing at point 42 thereby forming a conical section 44 and terminating in a diametrically reduced short core section 45 through which the gas fluid is delivered into the mixing body 14. Finally, the nozzle element 16 is provided with a circumferentially flanged lip 46, which seats against the outer surface of the mixing body 14 when the nozzle element 16 is threadedly engaged in the threaded inlet aperture 24 of the mixing body 14, as more clearly shown in FIG. 3.

The construction of the valve assembly 18 will be better understood by reference to FIGS. 5 through 10 of the drawings, wherein the various components of the valve assembly 18 are illustrated.

With reference to FIGS. 5 and 6 of the drawings, there is shown a top plate 50, forming the top portion of the valve assembly 18. The top surface 51 is provided with a central well 52, in which a plate or other decal having appropriate numerical indicia is disposed in the manner shown in FIG. 1, the well 52 further accommodating therein the disposition of the handle member 20. The top plate 50 further includes a central tubular core 54 which accommodates therethrough the shaft of the handle member 20 in a manner to be described hereinafter. The top plate 50 is further provided with a series of circumferentially disposed standoffs 56, the stands-offs 56 being spaced slightly inwardly from the outer periphery of the top plate 50. Each of the stand-offs 56 includes a centrally disposed threaded bore 58 which extends for a distance along the length of the stand-off 56. The undersurface 59 of the top plate 50 is provided with an undercut circumferential groove 60 for a purpose to be described more fully hereinafter.

The tubular core 54 is shown to be surrounded by a circular spring guide 55, the function and purpose of the spring guide 55 being more fully appreciated with reference to FIG. 3 and the discussion following hereinafter.

Finally, a tubular spring well 62 is formed on the undersurface 59 of the top plate 50, which, again, functions for a purpose to be more fully described hereinafter.

In FIGS. 9 and 10 of the drawings, the bottom plate 65, which comprises a part of the valve assembly 18, is illustrated.

In the embodiment shown in the drawings and described hereinafter, the bottom plate 65 is shown to be a separate element forming a part of the valve assembly 18. However, it is contemplated that in the commercial embodiment of this apparatus, the mixing body 14 and bottom plate 65 will be formed as a one-piece construction. That is, it is considered to be more economical in cost and more simplified in construction to form the bottom plate 65 as a unitary part of the valve assembly 18. In such a contemplated embodiment, the only separate key elements of the valve assembly 18 would be the top plate 50 and the valve plate disc 80. Since the bottom plate 65 is immovable with respect to the mixing body 14 in operation, the functioning of the apparatus is unaffected while at the same time, the anticipated cost of manufacture and time of assembly is reduced. Hence, it will be apparent that whether the bottom plate 65 is formed integrally with the mixing body 14, or as a separate element is merely a matter of manufacturing techniques and does not affect the operation of the valve apparatus 12. The bottom plate 65 is shown to be in the form of a circular disc having substantially the same diameter as the circular configuration of the top plate 50. The bottom plate 65 is shown to be provided with a series of circumferentially arranged apertures 66 disposed therethrough, each of the apertures 66 being so positioned as to be in vertical alignment with a corresponding threaded bore 58, in a corresponding stand-off 56 when the top plate 50 and bottom plate 65 are positioned in mating engagement. The top plate 50 and bottom plate 65 are held in mating engagement by means of a pluralty of screws 68 (FIG. 3) which are disposed through a corresponding aperture 66 in the bottom plate 65 and threadedly engaged in a corresponding threaded bore 58 of a stand-off 56, the stand-off 56 positioning the top plate 50 and bottom plate 65 in spaced relationship with respect to one another. The bottom plate 65 further includes a central well 69 which accommodates the lower end of a shaft 100 interconnecting the handle element 20 with the valve plate disc 80. The bottom plate 65 is similarly provided with an undercut circumferential groove 70 which cooperates with the circumferential groove 60 in the top plate 50, for retaining the filter support screen 22 therebetween, in the manner shown in FIG. 2 of the drawings.

The bottom plate 65 is further provided with a gas inlet opening 72 disposed therethrough at a point substantially intermediate the central wall 69 and the outer periphery of the bottom plate 65. The under surface 67 of the bottom plate 65 is provided with a circumferential collar 74, extending downwardly from the under surface 67 thereof and surrounding the lower end of the gas inlet opening 72 whereby gas flow is permitted through the inlet opening 72 and through collar 74. The outer diameter of the collar 74 is the same as, or slightly smaller than the diameter of the upper end 28 of the mixing chamber 26 whereby fluid-tight press-fitted seatment is established when the collar 74 is pressed into and seated in the upper end 28 of the mixing chamber 26.

The valve assembly 18 is completed by means of the valve plate disc 80, which is illustrated in FIG. 7 and 8 of the drawings. The valve plate disc 80 is shown to include a circumferentially arranged series of apertures 82, each of the apertures being slightly greater in diameter than the next adjacent aperture. The valve plate 80 is similarly circular in configuration but has an overall diameter which is slightly less than the diameter of the circle formed by the inner surfaces of the stand-offs 56 whereby the valve disc plate 80 is conveniently positioned and retained inside of the circle formed by the stand-offs 56 and positionally held between the top plate 50 and the bottom plate 65. The under surface 83 of the disc plate 80 is provided with an upstanding lug 84 which is centrally cored as at 86, the central core 86 extending through the lug 84 and completely through the body of the valve disc plate 80. The central bore 86 accommodates the placement therethrough of the shaft 100. It will be noted that the lug 84 is also provided with a cross bore 88 which is in registry with a similar cross bore 102 provided to the shaft 100. The shaft 100 is held in fixed relationship with respect to the valve disc plate 80 by means of a pin 104 which is frictionally inserted through cross bore 88 and cross bore 102, whereby the rotational movement of the handle element 20 will cause the corresponding rotational movement of the valve disc plate 80. The apertures 82 in the valve disc plate 80 are so positioned that each of the apertures 82 will be in vertical alignment with the gas inlet opening 72 in the bottom plate 65 and with the opening formed by the circumferential collar 74. Finally, the valve disc plate 80 is shown to be provided with a series of detent stops 90 also arranged in circumferential arrangement and positioned intermediate the apertures 82 and the central core 86. It will be noted that a detent stop 90 is provided intermediate the central core 86 and each of the apertures 82, thereby to create a stop position with respect to each of the apertures 82.

With reference to FIG. 3, the complete assembly of the valve apparatus 12 of the present invention is illustrated. As has been indicated hereinabove, the top plate 50 is held in spaced fixed arrangement with respect to the bottom plate 65 by means of screws 68 which are inserted through the apertures 66 in the bottom plate 65 and into the threaded bores 58 positioned in each of the stand-offs 56. The valve disc plate 80 is held in spaced relationship with respect to the top plate 50 by means of a spring 92 which is positioned about spring guide 55 of the top plate 50 and the lug 84 of the bottom plate 65. The spring 92 tends to keep the valve disc plate 80 in spaced away and spring biased relationship with respect to the top plate 50, holding the same in fixed secure relationship. It will further be noted that the tubular spring weld 62 formed in the undersurface 59 of the top plate 50 is provided with a stop spring 94 and having a ball bearing 95 disposed at the lower end thereof. The stop spring 94 tneds to urge the ball bearing 95 downwardly and against the valve disc plate 80, the ball bearing 95 cooperating with the detent stop 90 in the valve disc plate 80 thereby to provide intermittent stops adjacent each of the apertures 82 positioned circumferentially in the valve disc plate 80. Hence, in order to select an appropriately sized aperture 82, as desired by the operator, the operator need only rotate handle element 20, which is connected to the valve disc plate 80 by means of the shaft 100 in the manner described hereinabove, until the appropriate aperture is located, as indicated by the numerical indicia as shown in FIG. 1, such rotation of the handle element 20 causing a corresponding rotational movement of the valve disc plate 80. The ball bearing 95 will roll over the detent stops 90 and will ultimately rest in the particular detent stop 90 which is adjacent the corresponding aperture 82 selected by the operator. The spring 92 retains the valve disc plate 80 in biased relationship with respect to the top plate 50. It will further be noted that a small shoulder 97 is provided in opposed spaced relationship with respect to the gas inlet opening 72, and further, a peripherally raised collar 98 surrounds the gas inlet opening 72, the height of the peripheral collar 98 and shoulders 97 being substantially the same whereby the valve disc plate is kept in slightly spaced relationship with respect to the bottom plate 65. It will be appreciated therefore, that the valve disc plate 80 is maintained in position by means of the spring 92 and the shoulder 97 and peripheral collar 98.

It will further be noted that the circumferential grooves 60 and 70 respectively cooperate to retain the filter support screen 22 therebetween, the filter 23 carried by the filter screen 22 extending 360° peripherally around the valve assembly 18. The complete valve assembly, once assembled achieves a fluid tight seal, whereby any and all air entering through the filter 23 is filtered prior to its delivery through the pre-selected aperture 82, gas inlet opening 72 and the opening defined by the collar 74 into the mixing body 14 for mixture with oxygen being introduced into the mixing body through the central core 40 of the nozzle element 16. The pre-selection of an appropriate aperture 82 thereby regulates the quantity or volume of air which is permitted to enter into the mixing body 14 and which is further permitted to mix with regulated volume of oxygen entering into the mixing chamber 26 of the mixing body 14.

As was indicated hereinabove, the central core 40 is tapered thereby to form a conical section 44 terminating in a reduced core section 45, thereby creating a venturi effect. As oxygen is introduced into the core 40 and is forced through the conical section 44 into the reduced core section 45, the velocity of gas flow is thereby increased which, in turn, causes a vacuum effect at the lower end of the mixing chamber 26, thus drawing air into the chamber 26 for mixture with the oxygen travelling therethrough. This construction assures a good mixture of oxygen with air as the same is introduced into the mixing chamber 26 and for subsequent delivery through the delivery tube. Once the desired quantity of air and oxygen has been mixed in the mixing chamber, the mixture is directed through the frusto conical section 30 of the mixing body 14, and into the delivery tube 34. Hence, due to the construction of the mixer body 14 and nozzle element 16, the flow of the first fluid is accelerated thereby creating a subatmospheric lateral pressure in the mixing chamber 26 intraining the second fluid which then mixes with the first fluid. By varying both the size of the jet and the size of the aperture 82 in the valve plate disc 80, a precise mixture of the two fluids can be attained.

As has been indicated hereinabove, the complete valve assembly 18 is connected to the mixing body 14 by press fitting the circumferential collar 74 into the upper end 28 of the mixing chamber 26. The dimensions of the collar 74 and mixing chamber 26 are such that a fluid tight press fitted relationship is achieved. It will further be appreciated that due to this construction, the device may be easily disassembled to either repair any defective part, or to clean the interior portion of the valve assembly 18. Of course, such disassembling is further facilitated where the bottom plate 65 is formed integrally with the mixing body 14 since fewer parts or elements are involved in the disassembling procedure. Again, it will be appreciated that no significant change of function results from such an alternate construction.

The mixing body 14, nozzle element 16, top plate 50 and valve disc plate 80 are all preferably formed of anodized aluminum which is lightweight and easily machinable. The bottom plate 65 is preferably formed of a plasticized material since it is desirable to have the collar 74 formed of a plastic material thereby to achieve a good press fitting relationship between the collar 74 and the upper end 28 of the mixing chamber 26.

Where the bottom plate 65 is formed integrally with the mixing body 14, such a unitary element would be formed of anodized aluminum since the need for a press-fit between the collar 74 and the upper end 28 of the mixing chamber 26 is obviated.

With regard to the filter 23, in the preferred embodiment, the filter 23 is formed of an elasticized material whereby the filter 23 may be easily mounted about the valve assembly 18. Furthermore, replacement of the filter 23 is thereby facilitated since the operator need not disassemble the apparatus 12 in order to change the filter 23 but merely stretches the spent filter to remove the same and replace with a new filter. If desired, the filter 23 may be formed of a material having bacterial filtering properties so as to function as not only a filter for particular matter, but also as a bacterial filter. Hence, the selection of a filter material is deemed to be dependent upon the intended use of the apparatus 12.

It will therefore be appreciated that there has been provided by virtue of the present invention, a relatively simplified construction of a valve assembly and mixing body device which is particularly designed for achieving a controlled and precise mixture of oxygen and air which is particularly useful in connection with medical treatment procedures where a controlled environment is desirable or necessary. The valve apparatus of the present invention permits ease of assembly and disassembly whereby the various parts thereof may be repaired, exchanged, or changed where necessary, without at the same time requiring a high degree of mechanical skill. Furthermore, the valve apparatus of the present invention will result in the achievement of a very controlled and precise oxygen and air mi ture while at the same time avoiding the necessity of having a highly trained operator required in order to successfully operate the apparatus.

It will therefore be appreciated that all of the above objects and advantages have been accomplished by means of the valve apparatus depicted herein and various embodiments thereof to provide an extremely compact and low cost, while at the same time, highly precise valve structure.

While there has been described what at present is considered to be the preferred embodiment of the present invention it will be understood that various modifications will be made herein and it is intended to cover in the appended claims all such modifications as fall within the true spirit and scope of the invention.

What is claimed is:

1. An apparatus for metering and mixing a first fluid with a second fluid comprising, in combination, a mixing body having a fluid inlet and a fluid outlet,
an aperture disposed in said mixing body intermediate said fluid inlet and said fluid outlet,
a valve assembly removably engaged in said aperture,
said valve assembly comprising,
a top closure plate,
a bottom closure plate, said bottom closure plate being spaced from said top closure plate,
said top plate including a plurality of stand-offs extending downwardly from one surface thereof and, in use, contacting said bottom plate, thereby to maintain said top plate and said bottom plate in spaced relationship,
valve means fixedly disposed between said top and bottom closure plates, said valve means being adjustable so as to regulate the volume of a second fluid entering said mixing body through said valve means, whereby the first fluid entering said inlet of said mixing body is permitted to mix with a metered amount of the second fluid entering through said valve means so as to produce a controlled mixture of the first and second fluids.

2. The metering and mixing apparatus as set forth in claim 1 above, wherein said valve means is disposed in juxtaposed relation and adjacent to said bottom plate, and said valve means being rotatably movable with respect to said top plate and bottom plate.

3. The metering and mixing apparatus as set forth in claim 2 above, wherein said bottom plate includes a collar extending downwardly from one surface thereof, said collar defining an aperture extending through said bottom plate and said collar, and said valve means includes a plurality of various sized openings disposed therethrough in circumferential relation, said openings in said valve means being so disposed such that on rotation of said valve openings, one of said openings in said valve means may be caused to register with said aperture in said bottom plate thereby to control the volume of second fluid entering therethrough into said mixing body.

4. The metering and mixing apparatus as set forth in claim 3 above, which further includes handle means fixedly secured to said valve means and extending through said top plate thereby to provide external means for rotatably moving said valve means thereby to cause the registry of one of said various sized openings in said valve means with said aperture in said top plate to provide a fluid path for the first fluid into the mixing device.

* * * * *